United States Patent [19]

Fischer

[11] 4,156,165

[45] May 22, 1979

[54] DEVICE FOR THE ELECTRONIC GENERATION OF AN ELECTROSTATIC CHARGE PATTERN

[75] Inventor: Dieter Fischer, Frankfurt am Main, Fed. Rep. of Germany

[73] Assignee: Battelle-Institute e.V., Frankfurt am Main, Fed. Rep. of Germany

[21] Appl. No.: 856,529

[22] Filed: Dec. 1, 1977

[30] Foreign Application Priority Data

Dec. 2, 1976 [DE] Fed. Rep. of Germany ....... 2654563

[51] Int. Cl.$^2$ ..................... H05B 37/00; H05B 39/00; H05B 41/00
[52] U.S. Cl. .................................. 315/169.4; 355/3 P
[58] Field of Search ..................... 315/169 R; 361/225, 361/229; 346/150, 153, 162, 74.1; 355/3 SC, 3 P, 3 CH

[56] References Cited

U.S. PATENT DOCUMENTS 4,031,429  6/1977  Holz et al. ..................... 315/169 TV Primary Examiner—Alfred E. Smith
Assistant Examiner—Robert E. Wise
Attorney, Agent, or Firm—Fisher, Christen & Sabol

[57] ABSTRACT

A device is disclosed which selectively generates an electrostatic charge pattern directly on a portion of a surface for use in facsimile process machines or high-speed printers. A matrix is formed by two sets of electrodes, one perpendicular to the other, separated by a perforated metallic spacer having an electret film on each side between it and the electrodes. One set of electrodes is perforated corresponding to the perforations in the spacer. Separate control devices control the application of an electrical voltage to the sets of electrodes enabling an electrostatic charge to be generated directly on a surface covering the perforated electrode. Charged toner particles may be applied to the surface by known techniques to effectuate the printing or reproduction of an image.

9 Claims, 5 Drawing Figures

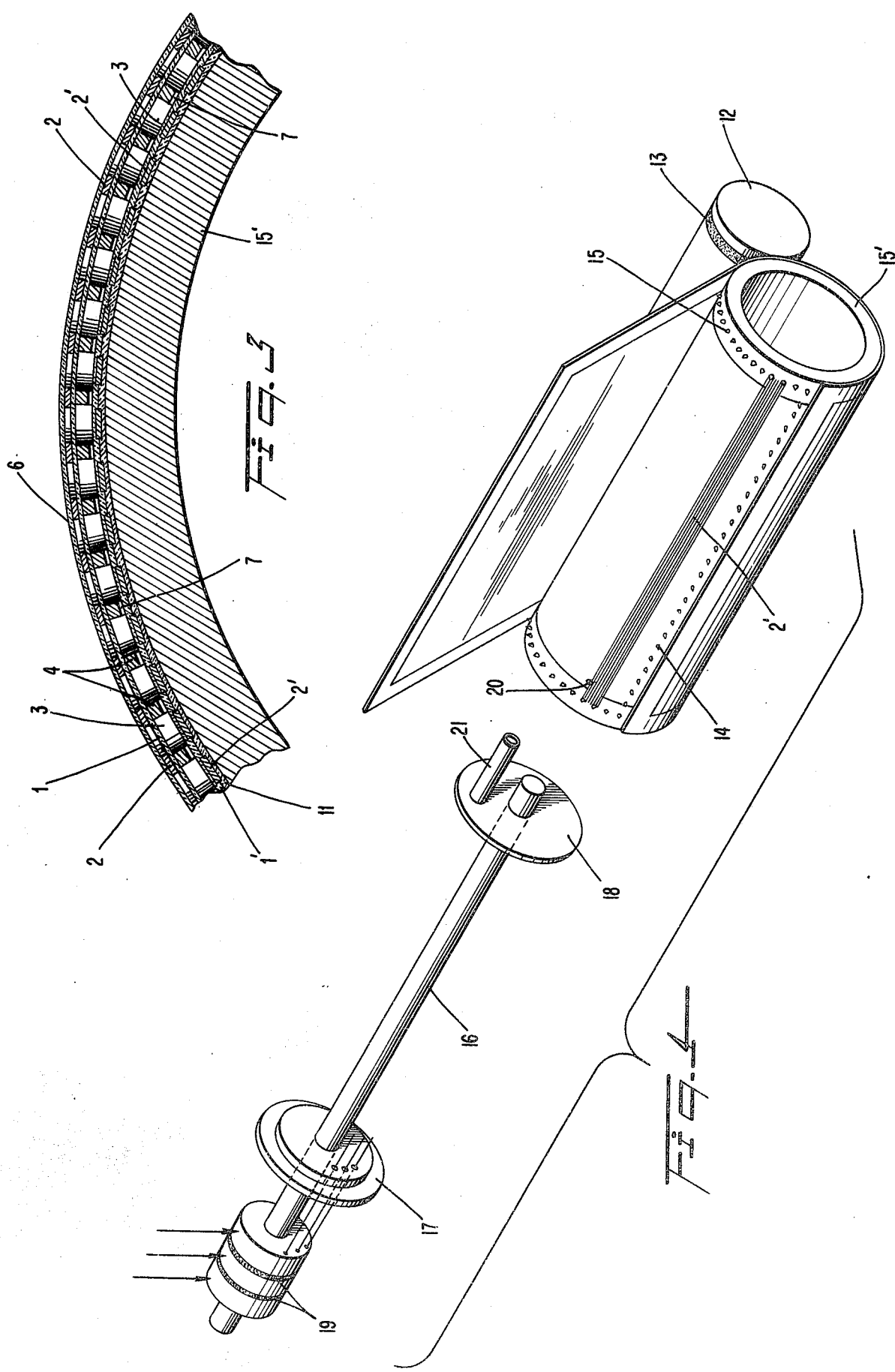

DEVICE FOR THE ELECTRONIC GENERATION OF AN ELECTROSTATIC CHARGE PATTERN

FIELD OF THE INVENTION

The present invention relates to a device for the electronic generation of an electrostatic charge pattern.

BRIEF DESCRIPTION OF THE PRIOR ART

Methods by which the information is transferred by means of electrical signals are known. According to these methods, the charge is applied by means of pin tubes or by means of discharge gaps in the form of a series of points. The charge pattern is generated directly on the paper. The paper used must therefore have special dielectric properties.

SUMMARY OF THE INVENTION

The purpose of the present invention is to provide a device which avoids the drawbacks of the conventional systems and, in particular, by which the charge pattern can be generated directly on the device. After the pattern has been made visible with toner particles, it can be transferred to regular paper. The device according to the invention consists of a multitude of single elements whose electrodes are interconnected line-by-line and column-by-column so as to form a matrix. The generation of a charge pattern with the assembly according to the invention does not require any mechanical motion and is completely noiseless. Since there is no mechanical motion, there is virtually no wear. The charge pattern is generated immediately in an electrical way and not via an electrophotographic process. The assembly is rather thin and in drum form requires little space, unlike the pin tube prior art devices. Furthermore, regular paper can be used for producing a visible image. This is an advantage over all those processes where the charge pattern is sprayed on. The assembly according to the invention is especially suited for facsimile processes and for all types of high-speed printers where the information is supplied electrically.

BRIEF DESCRIPTION OF THE DRAWINGS

FIG. 3 is a partial cross-sectional view of an alternative embodiment of a device according to the invention.

FIG. 4 is an exploded view of the alternative embodiment of FIG. 3.

DETAILED DESCRIPTION OF THE PREFERRED EMBODIMENT

Figure 1A:
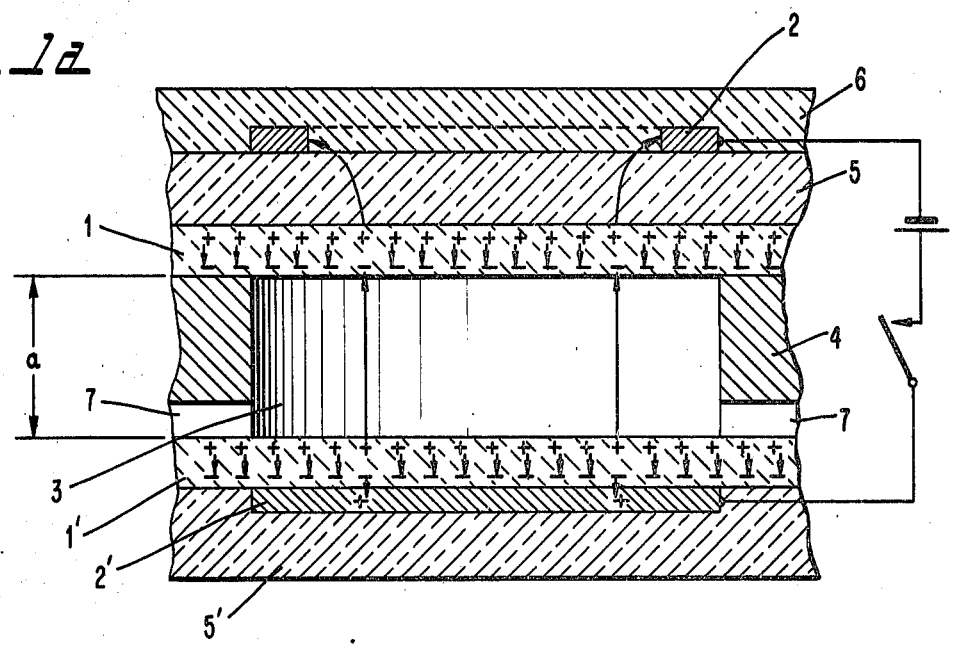
FIG. 1a is a partial sectional side view of the device according to the invention in its unactivated state.

The single element for the generation of a picture element consists of two electret films 1 and 1', which may be in the form of a thin layer and which are kept at a distance "a" from each other by metallic spacer 4 having hole 3 therethrough. The electret films are deposited onto insulating layers such as glass plates 5 and 5'. Between glass plate 5' and electret film 1' there is metal electrode 2'. A ring electrode 2 is attached to the upper side of the insulating layer 5. Ring electrode 2 is protected by another thin layer 6 which may be glass or similar insulating material. The space between electrets 1 and 1' is filled with a noble gas such as neon +0.1 percent argon. The distance "a" between the two electrets is approximately 100 μm. Ring electrode 2 has a diameter of about 400 μm.

Figure 1B:
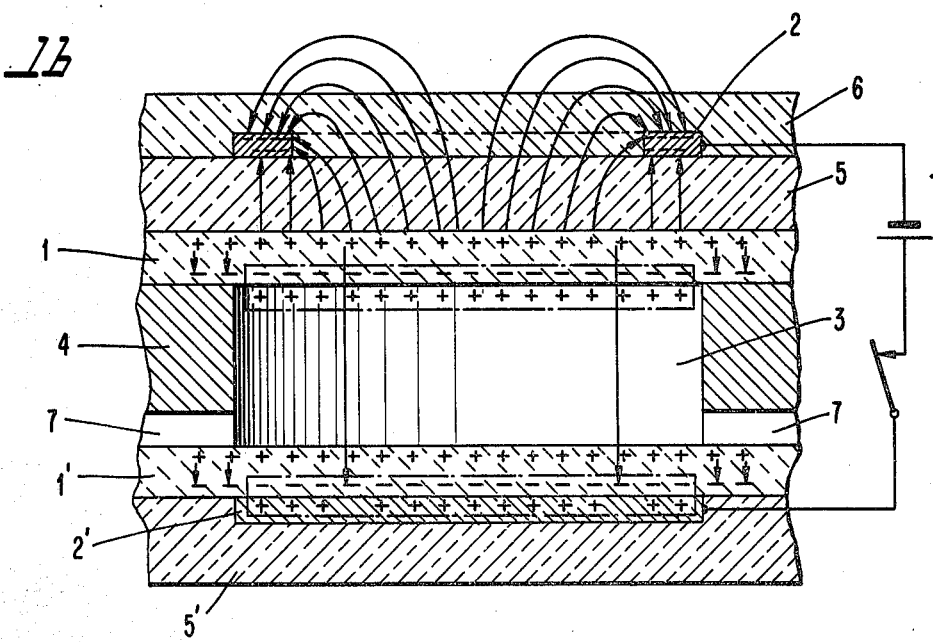
FIG. 1b is a partial sectional side view of the device in FIG. 1a in its activated state.

In the initial state, the electric fields generated by the charge within the electret films are closed, as shown in FIG. 1a. A weak field exists because of the finite distance between the electret films 1 and 1', and between the films and the electrodes 2 and 2' in the gas-filled space. But this field is weaker than the breakdown field strength, so that it cannot initiate a gas discharge. If, however, electrodes 2 and 2' are exposed to a voltage of a polarity that causes a field to be generated this generated field is added to the existing field and a gas discharge occurs which results in the state depicted in FIG. 1b. Since the discharge takes place between insulating electrodes, it is self-quenching.

As a result of the discharge, electret charge facing the gas-filled space is neutralized (double layer), so that the charge facing the other way acts like a monocharge. The monocharge of the upper electret film then induces a countercharge of almost the same intensity within the ring electrode, so that an electric field results between the two which extends partially to the outside of layer 6. This field can then attract, for example, charged toner particles.

The state brought about by the gas discharge is permanent. The initial state is re-established by igniting a gas discharge in the direction opposite to the one described above.

The element is selected by applying balanced-to-ground voltages to the electrodes 2 and 2'. During the time of writing about $-120$ V are applied to electrode 2, and about $+120$ V to electrode 2'. The electric field thus resulting in the gas-filled space is added to the bias produced by the electrets, so that the gas discharge is initiated. Because the electret layers are very thin (about 6 μm), a strong electric field of about $10^6$ V/cm builds up between electrodes 2 and 2' and the grounded spacer 4 at the edges of the spacer. If the surface of spacer 4 is coated with a thin oxide layer (e.g. $Al_2O_3$ or MgO), this field strength is sufficient for charge carriers to be emitted by field emission into the gas-filled space; these charge carriers serve as starter electrons for the gas discharge. The average ignition delays thus remain below 100 ns. The discharge itself takes only about 50 ns, so that the top of the pulse applied between the electrodes 2 and 2' is only approximately 150 ns. long. Since rise and decay times of about 50 ns. can easily be realised, the entire pulse duration is approximately 250 ns. In the written state according to FIG. 1b, the direction of the electret field within the gas-filled space 3 is opposite to that in the quenched state shown in FIG. 1a. By applying a pulse to electrodes 2 and 2', with a voltage of about $+120$ V at electrode 2 and about $-120$ V at electrode 2', a discharge is initiated in the state according to FIG. 1b which re-establishes the initial state according to FIG. 1a.

Figure 2:
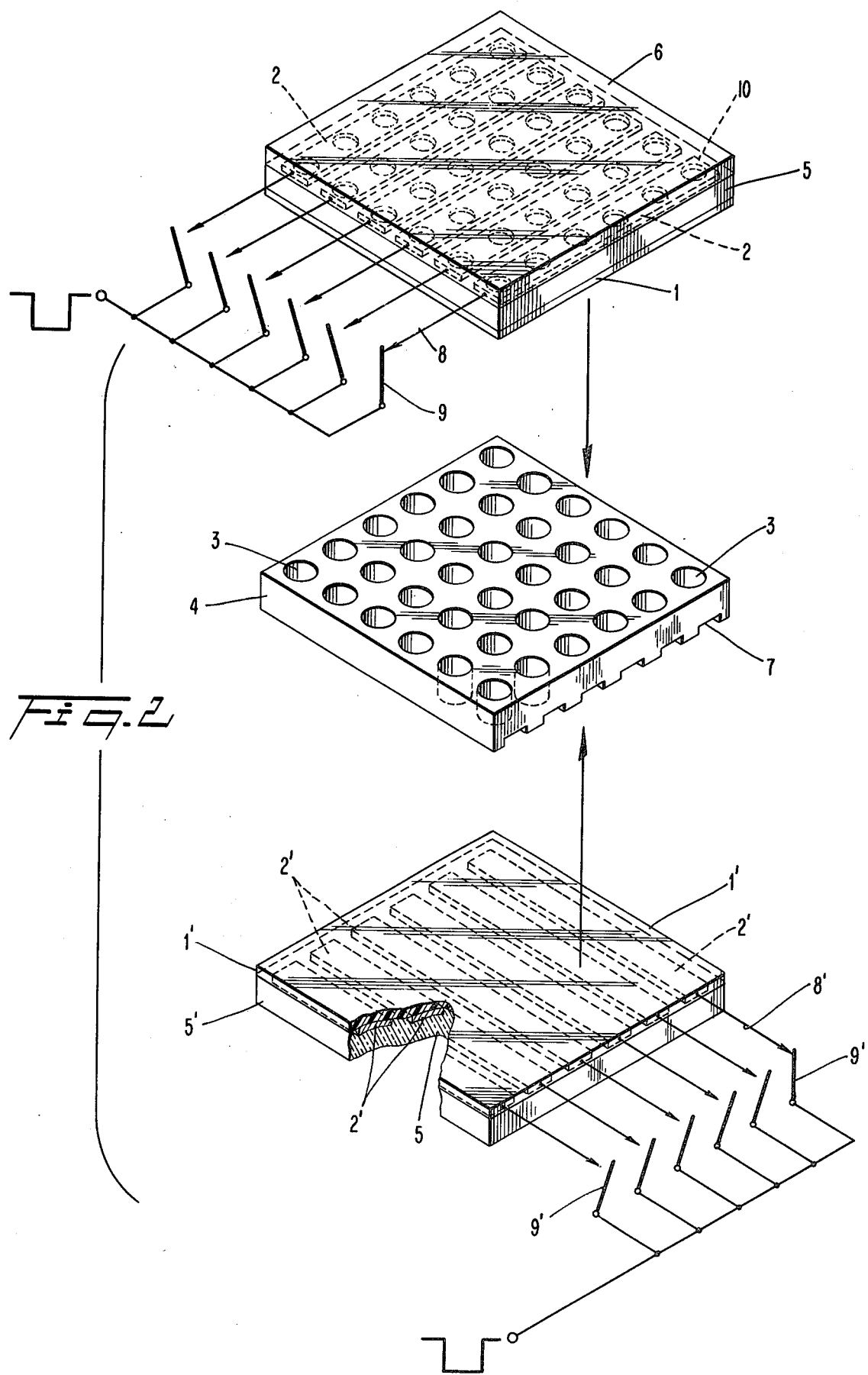
FIG. 2 is an exploded view of the device according to the invention.

The electrodes of the single elements 2 and 2' are interconnected line-by-line and column-by-column to form a matrix, which makes selection relatively easy. In FIG. 2 the electrodes 2 and 2' have the form of conductor paths, with the paths that lie opposite to each other running crosswise to each other. The conductor paths serving as ring electrodes are perforated. The individual gas-filled spaces 3 are formed by the holes in the spacer 4. This arrangement may also be designed as a drum.

The assembly according to the invention may be built, for example, in the following manner:

The parallel conductor paths 2' (having a width of 400 μm, and separated by a distance of 100 μm) are first applied to the glass plate 5'. Onto this is deposited electret layer 1' in the form of a thin, electrostatically charged PTFE or PFEP film with a thickness of approximately 6 μm. Different known methods can be used to charge the film, such as electron beam, gas discharge (corona), injection at elevated temperature (thermal) or injection via liquid contacts at room temperature. The latter method is an especially simple way of obtaining films with bipolar charge and a charge density of about $10^{-1}$ coul/cm$^2$ with a highly homogeneous charge distribution.

Onto this film is placed perforated plate 4 (in the preferred embodiment the plate thickness is approximately 100 μm, the diameter of the holes about 400 μm and the distance between holes about 100 μm). At the bottom side of plate 4 channels 7 run parallel to the conductor paths 2' and are used to supply the noble gas (neon +0.1% argon). The structure of the perforated plate 4 may be produced by known photolithography techniques. The material of plate 4 is preferably a high-strength metal coated with a thin Al$_2$O$_3$ or MgO layer. Onto the perforated plate is placed the charged PTFE or PFEP electret layer 1. Plate 6 consisted of a 100–200 μm-thick insulating high abrasion resistance (e.g. glass, polysulfone, kapton). Onto this plate are placed the parallel electrode paths 2 (having a width of 400 μm, and separated by a distance of 100 μm), which are provided with holes of approximately 300 μm in diameter. Insulating layer 5 having an approximate thickness of 2000 Å is deposited onto plate 6 by sputtering or other known techniques.

Layer 5 may be SiO$_2$ or similar material. Plate 6, with the electrodes 2 and insulating layer 5, is placed onto electret film 1. The different plates, in the arrangement shown in FIG. 2, are finally glued or welded together at the edges so as to be vacuum-tight, evacuated through a vacuum duct at the edge of plate 5', rinsed several times with neon +0.1 percent argon and filled with neon +0.1 percent argon at a gas pressure of about 700 torr. The gas inlet is then sealed vacuum-tight, by any known technique.

The electrodes 2 and 2' have connecting leads 8 and 8' extending under the adhesive layer to the exterior of the assembly and can thus be connected with the electronic control system. To select a specific element, balanced-to-ground pulses of ±120 V having a duration of 250 ns are applied to the conductor paths 2 and 2'. A voltage of 240 V is thus applied to the element located at the intersection of the two conductor paths so that a gas discharge is initiated. All other elements belonging to the selected conductor paths receive only 120 V; this voltage is not sufficient for ignition. In this way it is possible to select any individual element within the matrix. Since only 250 ns are required to write one picture element a very high writing speed can be achieved. If symbols are to be represented in a 5×7 matrix, 7 of the electrodes 2' can be selected in parallel, so that more than 10$^6$ symbols can be written per second. The result is an image of local electrical fields on the surface of plate 6, which can be made visible in well-known fashion by means of toners, and transferred to paper. This step is the rate-determining factor of the entire process. With regard to this aspect it is advantageous to design the assembly according to FIG. 2 in the form of a drum.

As illustrated in FIG. 2 a single element 10 is selected by application of a voltage pulse to the corresponding row- and column lines. This is effected by closing the corresponding selection switches 9, 9' as symbolized in FIG. 2. The switches are operated by commercially available digital decoders.

According to the embodiment of the invention shown as cross sectional view in FIG. 3 the carrier means has a hollow cylindrical shape. The base is a metal tube 151 carrying a dielectric layer 11. The electret film 1' to which the conductor paths 2' are applied is laid onto said dielectric layer 11. The individual gas spaces 3 are formed by the holes in the spacer 4. On their lower surface they are provided with channels 7 as indicated in FIG. 2. The electret film 1, carrying the perforated electrode paths 2 is mounted onto said spacer. On the top of this arrangement the abrasion resistive film 6 is applied.

FIG. 4 shows how the films of FIG. 3 can be welded to the tube 151 by a roller 12 carrying a heated ring 13 on both ends. The electrodes 2 and 2' are contacted to the feedthroughs 14 and 15 leading to the inside of the tube 151 where the switches 9 and 9' of FIG. 2 are supplied. The tube 151 is centred by the axle 16 with the aid of the discs 17 and 18 which are sealed to the tube 151. The feeding voltages for the electronic switches are applied via collecting rings 19. The decoder signals for operating the switches may either be applied via collecting rings or optically via optoelectronic sensor elements located around the outer diameter of the tube 151 near one end of this tube. The individual gas spaces 3 are evacuated via the holes 20 and the vacuum duct 21 which conicide with the channels at the lower surface of the spacer 4. After application of noble gas, the vacuum duct 21 is sealed.

I claim:

1. A device for the electronic generation of a pattern of electrostatic charges comprising:
    a. a plurality of first electrodes;
    b. a plurality of second electrodes oriented perpendicularly to said first electrodes and spaced therefrom so as to form a matrix;
    c. spacer means between said first and second electrodes having perforations therethrough filled with inert gas;
    d. a first insulating substrate having said plurality of first electrodes attached to an upper surface and a first electret film on a lower surface, said first substrate located on an upper surface of said spacer means;
    e. a second insulating substrate having said plurality of second electrodes and a second electret film on an upper surface, said second substrate located on a lower surface of said spacer means; and
    f. means to generate a voltage in selected ones of said first and second electrodes so as to cause a gas discharge thereby causing an electrostatic charge at selected points on a surface covering said plurality of first electrodes.

2. The device of claim 1 wherein said plurality of first electrodes are perforated, said perforations coinciding with those perforations through said spacer means.

3. The device of claim 1 wherein the surfaces of said spacer means are coated with a layer of Al$_2$O$_3$.

4. The device of claim 1 wherein the surfaces of said spacer means are coated with a layer of MgO.

5. The device of claim 1 wherein said voltage is generated in pulse form.

6. The device of claim 7 wherein the duration of said voltage pulse is not greater than 250 ns.

7. The device of claim 7 wherein a voltage of −120 V is applied to selected ones of said first electrodes and a voltage of +120 V is applied to selected ones of said second electrodes.

8. The device of claim 1 wherein said spacer means has a hollow cylindrical shape and said perforations extend radially through said spacer means.

9. The device of claim 1 further comprising a. a hollow base cylinder;
b. a layer of dielectric material affixed to the outer surface of said hollow base cylinder, said plurality of second electrodes, said spacer means and said plurality of first electrodes located on said dielectric material; and,
c. an abrasion resistant layer covering the radially outermost surfaces of said plurality of first electrodes.

* * * * *